US007325020B2

(12) United States Patent
de Brébisson

(10) Patent No.: US 7,325,020 B2
(45) Date of Patent: Jan. 29, 2008

(54) INPUT AND EVALUATION OF FRACTIONS USING A CALCULATOR

(75) Inventor: Cyrille de Brébisson, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 688 days.

(21) Appl. No.: 10/636,785

(22) Filed: Aug. 8, 2003

(65) Prior Publication Data

US 2005/0033784 A1    Feb. 10, 2005

(51) Int. Cl.
*G06F 3/00*    (2006.01)
(52) U.S. Cl. .................................. 708/137; 708/160
(58) Field of Classification Search ............... 708/137, 708/160
See application file for complete search history.

(56) References Cited

U.S. PATENT DOCUMENTS

| | | | | | |
|---|---|---|---|---|---|
| 4,545,022 | A | * | 10/1985 | Hughins | 708/137 |
| 5,025,403 | A | * | 6/1991 | Stephens | 708/137 |
| 5,089,980 | A | * | 2/1992 | Bunsen et al. | 708/137 |
| 5,101,368 | A | * | 3/1992 | Kaplan | 708/206 |
| 5,138,566 | A | * | 8/1992 | Comforti | 708/137 |
| 5,241,489 | A | * | 8/1993 | Koumo et al. | 708/170 |
| 5,481,626 | A | * | 1/1996 | Matsubayashi | 382/189 |
| 5,586,060 | A | * | 12/1996 | Kuno et al. | 708/160 |
| 5,870,319 | A | * | 2/1999 | Thornton et al. | 708/160 |
| 2002/0007385 | A1 | * | 1/2002 | Stoutemyer | 708/200 |

OTHER PUBLICATIONS

"TI-89 Guidebook" [Online] 1999,—2002, pp. 13-56, XP002409901 Retrieved from the Internet: URL:http://education.ti.com/guidebooks/graphing/8992p/8992bookeng.pdf.

* cited by examiner

*Primary Examiner*—Tan V. Mai

(57) ABSTRACT

A method of input and evaluation of fractions using a calculator is described. The calculator receives a user-entered expression including a fraction where the fraction is entered using a division key. The user-entered expression causes the calculator to evaluate the user-entered expression and display the evaluated user-entered expression. A calculator enabling input and evaluation of fractions includes means for receiving and displaying a user-entered expression including a fraction entered using a division key is described. The calculator further includes a processor for evaluating the user-entered expression using the means for evaluating the expression. The evaluated user-entered expression is displayed using a calculator display.

17 Claims, 8 Drawing Sheets

INPUT AND EVALUATION OF FRACTIONS USING A CALCULATOR

RELATED APPLICATIONS

This application is related to each of the following applications: "Graphical Calculator User Interface for Function Drawing" (HP Docket No.: 200310007-1); "Function Drawing in Polar Plan Using a Calculator" (HP Docket No.: 200310008-1); "Previous Calculation Reuse in a Calculator" (HP Docket No.: 200310016-1); and "Graphical Calculator" (HP Docket No.: 200310014-1), each assigned to the present assignee, all of which are hereby incorporated by reference in their entirety, and all of which are being filed concurrently herewith.

FIELD OF THE INVENTION

The present invention relates to a method of and apparatus for input and evaluation of fractions using a calculator.

BACKGROUND

A hand-held calculator is an important and useful device. Similar to a computer, the hand-held calculator has a processor, a memory, a display, and an input device; however, there are important distinguishing differences between the hand-held calculator and the computer.

The hand-held calculator is a specialized device and not a general purpose device, as is true of a computer. Because of this specialization, typically the hand-held calculator costs less, has a longer useful lifespan, and is more reliable and more portable than the computer.

Whereas a general purpose computer is capable of executing many different programs, a hand-held calculator typically executes a single program and less frequently supports execution of user-created programs. Normally, a hand-held calculator supports addition, subtraction, multiplication, and division of numbers, either integer-based or decimal-based, entered by a user and displays the results on a built-in display.

A graphical calculator is a further specialized version of a hand-held calculator having a display which is typically larger than a regular hand-held calculator display in order to enable graph output. In many instances, graphical calculator displays are liquid crystal displays for more accurate representation and enhanced readability of a graph output.

A graphical calculator is able to display a graph of a specific expression, e.g. a sine wave representing a sinusoidal function, entered by a user. Disadvantageously, graphical capabilities on hand-held calculators are only available as part of expensive and complex, "high end" scientific calculators. These graphical calculators are more expensive than other calculators, typically costing hundreds of dollars. These graphical calculators are more complicated to operate than other calculators because of the large amount of functionality incorporated therein.

The increased functionality has required a corresponding increase in the number of keys required for manipulating and using the calculator. For example, currently available graphical calculators have approximately fifty (50) keys including two (2) shift or modifier keys for a user to manipulate, e.g. a Texas Instruments (TI) 83 plus calculator has 51 keys and two (2) shift keys which can be used concurrently, enabling up to four functions to be assigned per the 51 remaining keys, and a Hewlett-Packard (HP) 48G+/GX calculator has 49 keys and three (3) shift keys, enabling up to six functions to be assigned per the remaining 49 keys.

Additionally, and in conjunction with the larger number of keys present, a user must contend with different modes of operation of the current graphical calculator. Different modes of operation, accessible via specific keys and/or key sequences, must be utilized in order to access specific calculator functionality, e.g. a graphical calculator may include a fraction mode, a decimal mode, a binary mode, a hexadecimal mode, a finance mode, a statistics mode, and a graph mode.

Further, expression input requires increasingly complicated key manipulations and combinations. For example, in order to graph an expression, there are typically three combinations to be entered: a mode specifying combination, an expression entry combination, and a completion combination. The mode specifying combination may include manipulation of a graph key to instruct the calculator to graph the following expression entry. The expression entry combination may include manipulation of multiple keys to input the expression to be graphed and the completion combination includes manipulation of a key, e.g. an enter key, to instruct the calculator to perform the preceding operations, i.e. graph the entered expression.

Requiring a user to manipulate multiple keys increases the need for learning, the possibility of error and may lead to frustration on the part of the user. Also, requiring additional key presses by a user requires more time and slows the entry and use of the calculator by the user. The addition of multiple modes, complicated expression input combinations, and ever-increasing numbers of keys results in a very complicated device.

As further evidence of increasing complexity, the user manual for a currently available hand-held graphical calculator has dramatically increased in size in order to fully explain the use of the calculator. For example, the above-cited TI-83 plus calculator manual includes 269 pages and the HP 48G+/GX calculator manual includes 506 pages. These are very long documents which are typically not read by users. Further, users are likely to be deterred from reading the manual because of the imposing size of the manual.

Graphical calculators are very popular and effective educational aides. School students using graphical calculators can easily visualize complex functions; however, the complexity and cost of currently available graphical calculators deters many students and schools from making a purchase. Purchasers are dissuaded by the size of the manual, multiple modes of operation, and the number of keys and key combinations required for inputting expressions.

Prior hand-held calculators of which the inventor is aware, enable a user to input fractions, i.e. fractional numbers or numbers having a fractional component such as $\frac{2}{3}$ or $3\frac{2}{3}$; however, the prior calculators rely on one of two approaches. Prior approaches for calculators receiving fraction input include a fraction mode and designation of a fraction key.

Using a fraction mode and designating a fraction key both require a user to manipulate a designated key on the calculator thereby providing input to the calculator indicating that the subsequently entered expression is to be evaluated as a fraction. Disadvantageously, the user is required to learn and memorize an additional calculator mode and corresponding activation key, and manipulate additional keys for expression entry. Problematically, the user is more likely to mis-key either the designated fraction mode key or the expression and, at a minimum, additional keystrokes are required to input the fraction. Additional keystrokes necessitates more complexity, more time for input, and increased chance of an input error and frustration for the user.

Further disadvantageously, the use of a designated fraction key is expensive in terms of cost and keyboard area for implementation. Additionally, the increased calculator complexity requires a corresponding increase in the size of the user manual needed to describe operation of the calculator to the user.

There is a need in the art for a method of and apparatus for input and evaluation of fractions using a hand-held calculator.

SUMMARY

It is therefore an object of the present invention to provide a method of and apparatus for input and evaluation of fractions using a hand-held calculator.

The present invention provides a method of and apparatus for input and evaluation of fractions using a hand-held calculator.

A method aspect of input and evaluation of fractions using a calculator includes receiving a user-entered expression including a fraction where the fraction is entered using a division key. The user-entered expression causes the calculator to evaluate the user-entered expression and display the evaluated user-entered expression.

An apparatus aspect includes a calculator enabling input and evaluation of fractions having means for receiving and displaying a user-entered expression including a fraction entered using a division key. The calculator further includes a processor for evaluating the user-entered expression. An attached calculator display displays the evaluated user-entered expression.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
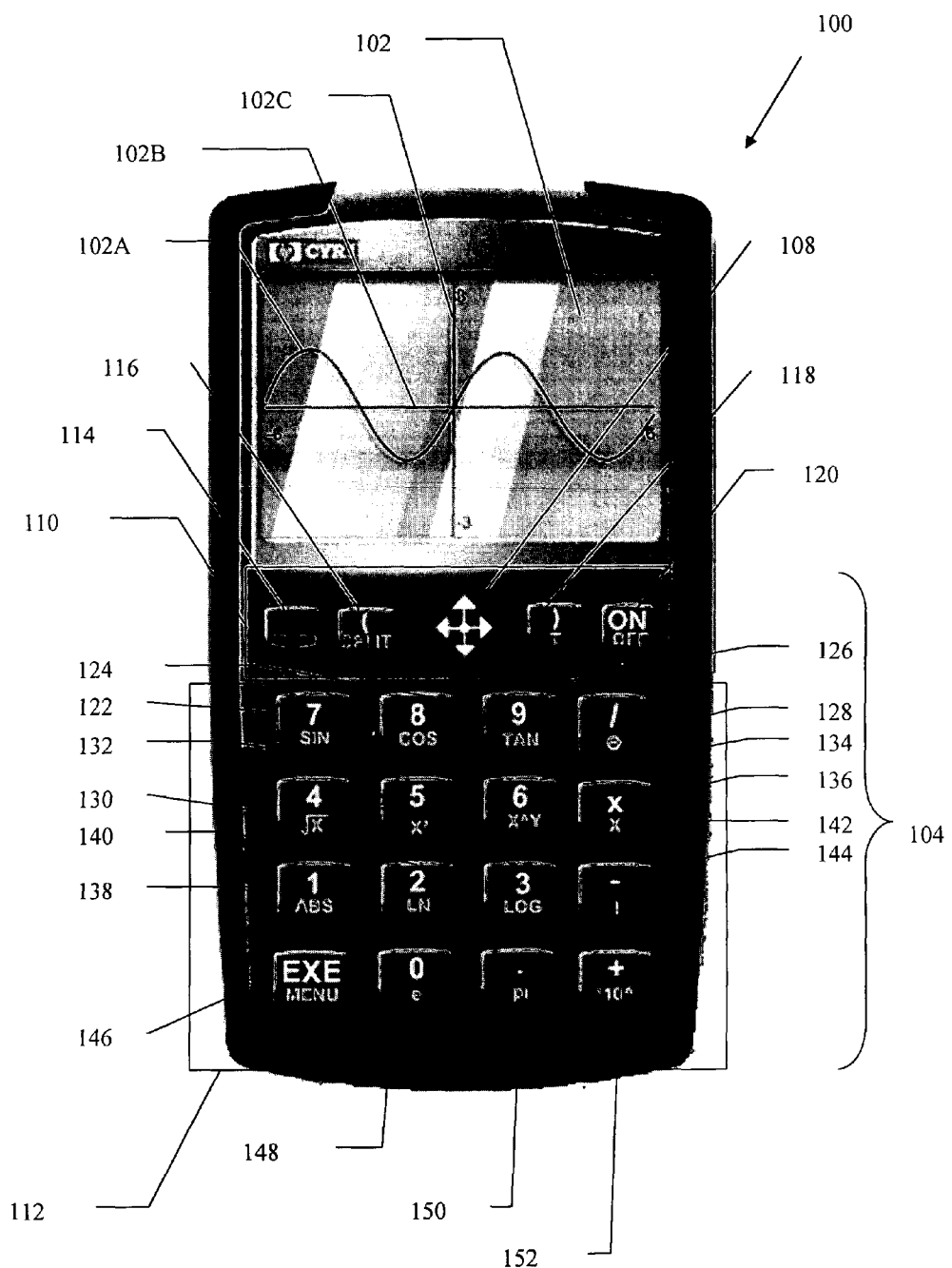
FIG. 1 is a front face view of a graphical calculator according to an embodiment of the present invention.

FIG. 1 is a front face view of a graphical calculator 100 according to an embodiment of the present invention.

Calculator 100 includes a display 102 and a primarily key-based input area 104 set in a front face 106. Although front face 106 is depicted as a rounded rectangle, it is to be understood that the front face may be manufactured to be any of a number of different shapes. Further, although a specific number, type and configuration of input mechanisms are described below, it is to be understood that variations in the number, type, and configuration of input mechanisms may be found in different embodiments of the present invention.

Display 102 is a rectangular liquid crystal display (LCD) which is 96 pixels wide and 64 pixels in height. As shown in FIG. 1, display 102 displays a sine wave 102A on a graph having an X axis 102B and a Y axis 102C. Input area 104 includes four keys and one directional input device 108 in a row 110 and 16 keys arranged in a four by four grid 112. Although a four by four grid is depicted and described, it is to be understood that the input area keys may be arranged in different configurations.

Directional input device 108 is used to navigate menus and perform information input, recall, and editing. Directional input device 108 may be manipulated by the user to input at least four directions, i.e. up, down, left, and right to calculator 100. Input of the left arrow of directional input device 108 inputs a move left command to processor 204 thereby moving the current cursor position on display 102 to the left one position. Input of the right arrow of directional input device 108 inputs a move right command to processor 204 thereby moving the current cursor position on display 102 to the right one position.

A secondary function of directional input device 108, accessible via use of shift key 114 as described below, is editing an expression on display 102. The input of shift key 114 in conjunction with or prior to left arrow of directional input device 108 inputs a backspace command to processor 204 thereby deleting the character to the left of the current cursor position on display 102. The input of shift key 114 in conjunction with or prior to right arrow of directional input device 108 inputs a delete command to processor 204 thereby deleting the character to the right of the current cursor position on display 102.

The four remaining keys in row 110 are shift key 114, open parenthesis key 116, close parenthesis key 118, and power key 120.

Shift key 114 is used to access a second set of functions, i.e. secondary functions, assigned to the remaining keys on calculator 100. For example, user activating power key 120 turns on calculator 100; however, activation of power key 120 subsequent to activation of shift key 114 turns off the calculator. In a similar fashion, each of the remaining keys of calculator 100 has an assigned secondary function.

Open parenthesis key 116 inputs a beginning parenthesis in a user-entered expression. The secondary function of open parenthesis key 116 is to input a command causing calculator 100 to split a graphical output on display 102 such that one half of the display is a graph and the other half is numerical information related to the graph displayed.

Close parenthesis key 118 inputs an ending parenthesis in a user-entered expression. The secondary function of close parenthesis key 118 is to input a T variable in a user-entered expression.

Power key 120 turns on calculator 100 and, as described above, the secondary function of power key 120 is to turn off calculator 100. Additionally, power key 120 operates as a clear key after calculator 100 is turned on, i.e. the power key may be used to clear the displayed expression on display 102. Manipulation of shift key 114 followed by right arrow of directional input device 108 deletes input characters to the right of the current input position and manipulation of shift key 114 followed by left arrow of directional input device 108 deletes input characters to the left of the current input position.

Beginning in the upper left corner of four by four grid 112, the description of the remaining keys is now provided in a row, column order.

Row 1, column 1 key 122, i.e. the seven key, inputs a seven (7) value in a user-entered expression and has a secondary function of inputting a sin function in a user-entered expression. Row 1, column 2 key 124, i.e. the eight key, inputs an eight (8) value in a user-entered expression and has a secondary function of inputting a cos function in a user-entered expression. Row 1, column 3 key 126, i.e. the nine key, inputs a nine (9) value in a user-entered expression and has a secondary function of inputting a tan function in a user-entered expression. Row 1, column 4 key 128, i.e. the division key, inputs a division (/) function in a user-entered expression and has a secondary function of inputting a theta (θ) variable in a user-entered expression. Further, as described in detail below, the division key 128 is used to input a fractional value to calculator 100. Division key 128 is input between input of the digits of the numerator and denominator of a fraction.

Row 2, column 1 key 130, i.e. the four key, inputs a four (4) value in a user-entered expression and has a secondary function of inputting a square root function in a user-entered expression. Row 2, column 2 key 132, i.e. the five key, inputs a five-(5) value in a user entered expression and has a secondary function of inputting a squared function, i.e. raising a value to the second power, in a user-entered expression. Row 2, column 3 key 134, i.e. the six key, inputs a six (6) value in a user-entered expression and has a secondary function of inputting a value raised to the power of a subsequently entered value function, i.e. X raised to the power of Y, in a user-entered expression. Row 2, column 4 key 136, i.e. the multiplication key, inputs a multiplication (*) function in a user-entered expression and has a secondary function of inputting an X variable in a user-entered expression.

Row 3, column 1 key 138, i.e. the one key, inputs a one (1) value in a user-entered expression and has a secondary function of inputting an absolute value function in a user-entered expression. Row 3, column 2 key 140, i.e. the 2 key, inputs a two (2) value in a user-entered expression and has a secondary function of inputting a natural logarithm function in a user-entered expression. Row 3, column 3 key 142, i.e. the three key, inputs a three (3) value in a user-entered expression and has a secondary function of in putting eight logarithm function in a user-entered expression. Row 3, column 4 key 144, i.e. the minus key, inputs a subtraction (−) function in a user-entered expression and has a secondary function of inputting a NOT function in a user-entered expression.

Row 4, column 1 key 146, i.e. the execute key, inputs an execute command to calculator 100 and has a secondary function of inputting a menu command to the calculator. Row 4, column 2 key 148, i.e. the zero key, inputs a zero (0) value in a user-entered expression and has a secondary function of inputting an e value in a user-entered expression. Row 4, column 3 key 150, i.e. the dot key, inputs a decimal point in a value entry and has a secondary function of in putting a pi constant value in a user-entered expression. Row 4, column 4 key 152, of i.e. the plus key, inputs an addition (+) function in a user-entered expression and has a secondary function of in putting a times ten to the power of a subsequently entered value, i.e. "*10^Y", in a user-entered expression.

Figure 2:
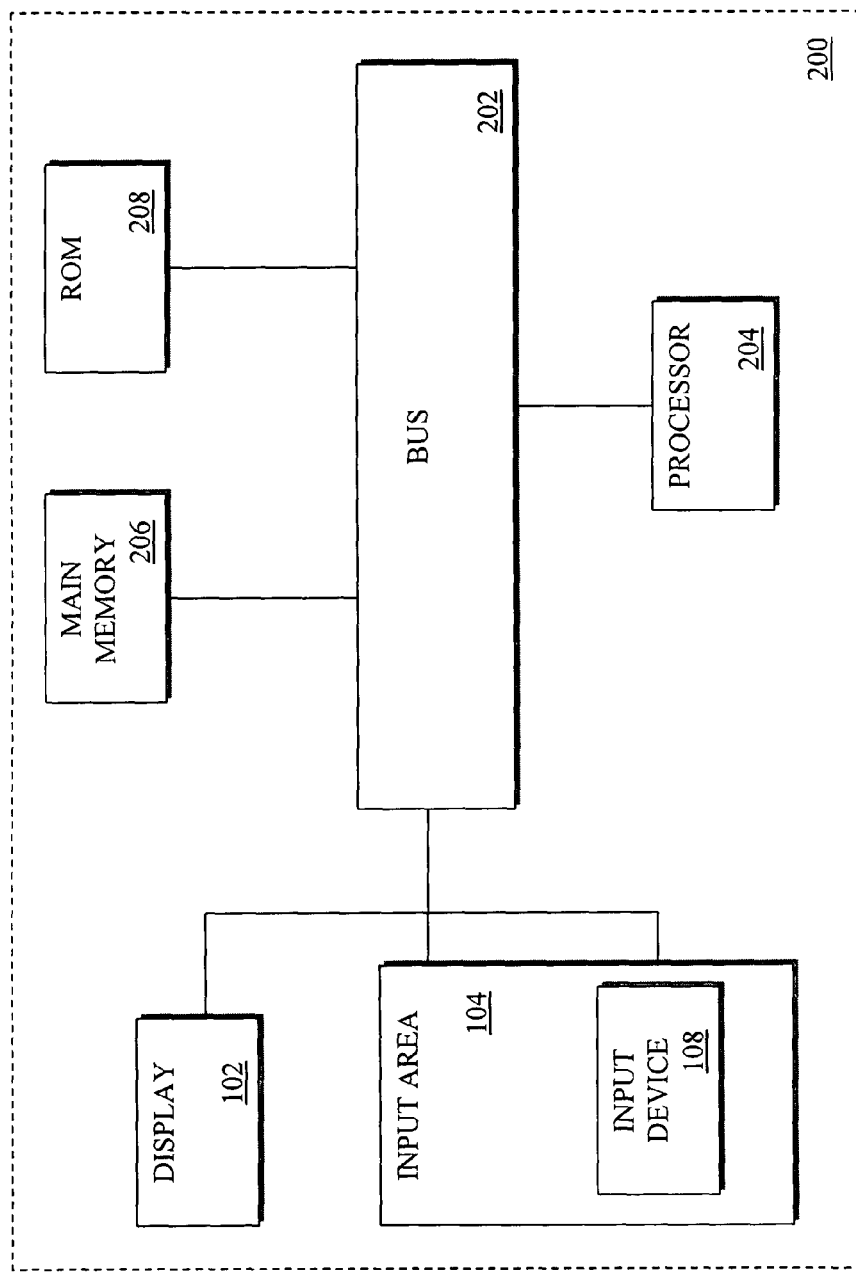
FIG. 2 is a high level block diagram of a graphical calculator according to an embodiment of the present invention.

FIG. 2 is a block diagram illustrating an exemplary calculator 100 upon which an embodiment of the invention may be implemented.

Calculator 100 includes a bus 202 or other communication mechanism for communicating information, and a processor 204 coupled with the bus 202 for processing information. In one particular embodiment, processor 204 is a 16 bit processor. Calculator 100 also includes a main memory 206, such as a random access memory (RAM) or other dynamic storage device, coupled to the bus 202 for storing data and expressions according to an embodiment of the present invention and instructions to be executed by processor 204. Main memory 206 also may be used for storing temporary variables or other intermediate information during execution of instructions to be executed by processor 204. In one particular embodiment, main memory 206 is an 8 Kilobyte RAM. Further, it is to be understood that in alternate embodiments, the components of calculator 100 may be combined onto a single integrated circuit, e.g. processor 204 and main memory 206 may be combined on a single "system on a chip."

Calculator 100 further includes a read only memory (ROM) 208 or other static storage device coupled to the bus 202 for storing static information and instructions for the processor 204. In one particular embodiment, ROM 208 is a 128 Kilobyte ROM.

Calculator 100 may be coupled via the bus 202 to a display 102, such as the above-described 96 * 64 pixel LCD, for displaying an interface to a user. An input area 104, as described above with reference to FIG. 1, is coupled to the bus 202 for communicating information, e.g. user-entered expressions and values, and command inputs to the processor 204. An input device 108, as described above with respect to FIG. 1, is part of input area 104 and communicates direction information and command selections to processor 204 and controls cursor movement on the display 102. This input device typically has two degrees of freedom in two axes, a first axis (e.g., x) and a second axis (e.g., y) allowing the device to specify positions in a plane.

The invention is related to the use of calculator 100, such as the depicted calculator of FIG. 2, to input and apply operations, e.g. expressions, to data and graph the results of operations by driving display 102. According to one embodiment of the invention, data is stored and accessed from main memory 206 by calculator 200 in response to processor 204 executing sequences of instructions contained in main memory 206 in response to input received via input area 104. A user interacts with the calculator 100 via a user interface displayed (as described below) on display 102.

Execution of the sequences of instructions contained in the main memory 206 causes the processor 204 to perform the process steps described below. In alternative embodiments, hard-wired circuitry may be used in place of or in combination with computer software instructions to implement the invention. Thus, embodiments of the invention are not limited to any specific combination of hardware circuitry and software.

According to an embodiment of the present invention, a user is able to input and evaluate fractions as user-entered expressions using a calculator. A user using calculator 100 manipulates number keys, i.e. 0-9 keys 122, 124, 126, 130, 132, 134, 138, 140, 142, and 148, to input one or more digits representative of the numerator for a fraction to be evaluated by processor 204. The user then manipulates division key 128 to input a division symbol to processor 204. After entering the division symbol, the user manipulates the number keys again to input one or more digits representative of the denominator for the fraction to be evaluated by processor 204. Advantageously, fractions may be input in the same manner as written by a user on paper; thereby providing a more natural feel to the user using calculator 100 for fraction evaluation. Further, because fractions are input as written, users may more easily remember how to input fractions.

After input of the fraction is complete, the user manipulates execute key 146 to command processor 204 to evaluate the input fraction. After receipt of the evaluate command, processor 204 evaluates the fraction and determines if the fraction can be reduced or simplified, e.g. $4/8=1/2$. If the fraction is reducible, processor 204 reduces the fraction and displays the reduced fraction to the user using display 102. At the same time, processor 204 may also display the decimal equivalent of the fraction beside the fraction to the user using display 102.

Calculator 100 will convert any user-entered expression using only integers, parenthesis, addition, subtraction, multiplication, and division into a fractional form. That is, $1+2/3(4+4/3)$ yields a fractional result of $41/9$. It is to be understood that additional mathematical functions may be used in different embodiments.

Figure 3A:
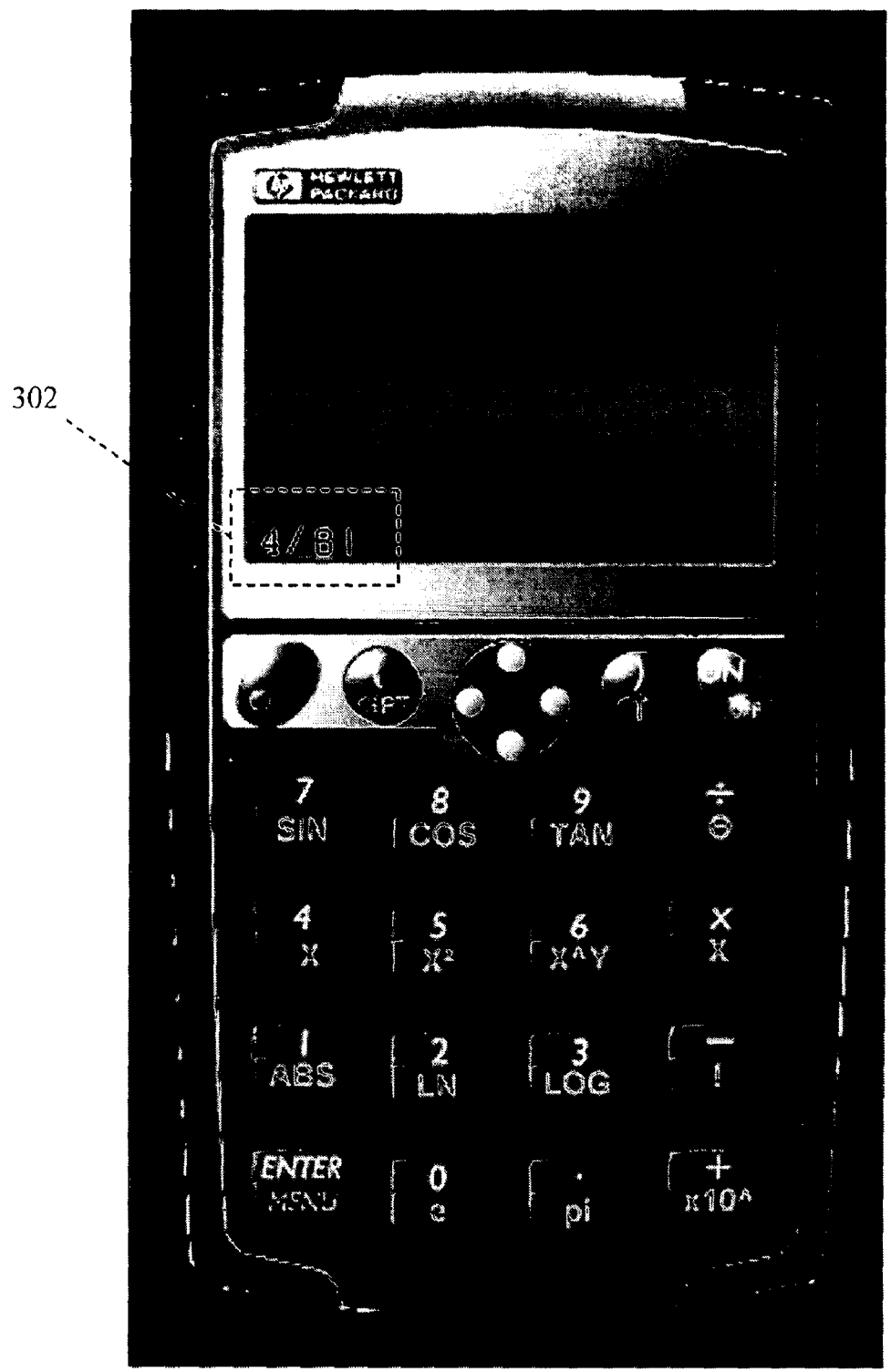
FIGS. 3a and 3b are depictions of a calculator display during operation of a calculator according to an embodiment of the present invention.

Three examples are now provided to facilitate description of the operation of the calculator according to an embodiment of the present invention. With reference to FIG. 3a, display 102 displays a user input of a fraction value 302, i.e. "4/8", by sequential manipulation of the four key 130, the division key 128, and the eight key 124. The upright bar symbol, "|", at the end of fraction value 302 indicates the cursor position to the user during editing/input of the user-entered expression, i.e. fraction value 302.

Figure 3B:
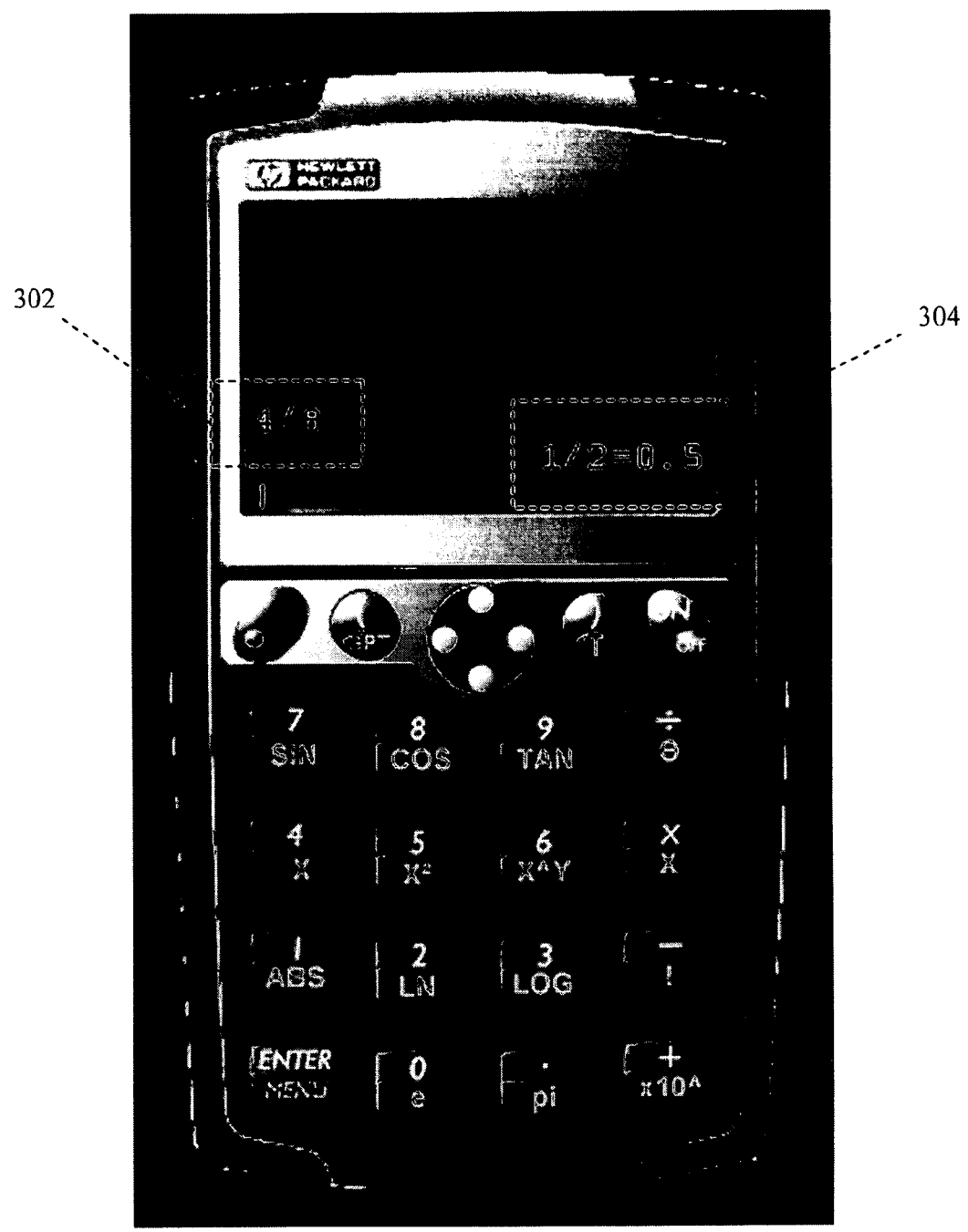

After the user manipulates the execute key 146, processor 204 evaluates the input fraction value 302 and drives display 102 to display the result 304, i.e. "1/2=0.5", to the user as depicted in FIG. 3b. Result 304 includes a fraction version of the result separated by an equal sign from the decimal version of the result. It is to be understood that in alternate embodiments only one of the fraction and decimal version may be displayed.

Figure 4A:
FIGS. 4a and 4b are depictions of a calculator display during another operation of a calculator according to an embodiment of the present invention.

With reference to FIG. 4a, display 102 displays a user input of a compound fraction 306, i.e. "2 and 2/3," by sequential manipulation of the two key 140, the addition key 152, the two key, the division key 128, and the three key 142. The upright bar symbol, "|", at the end of fraction value 306 indicates the cursor position to the user during editing/input of the user-entered expression, i.e. fraction value 306.

Figure 4B:
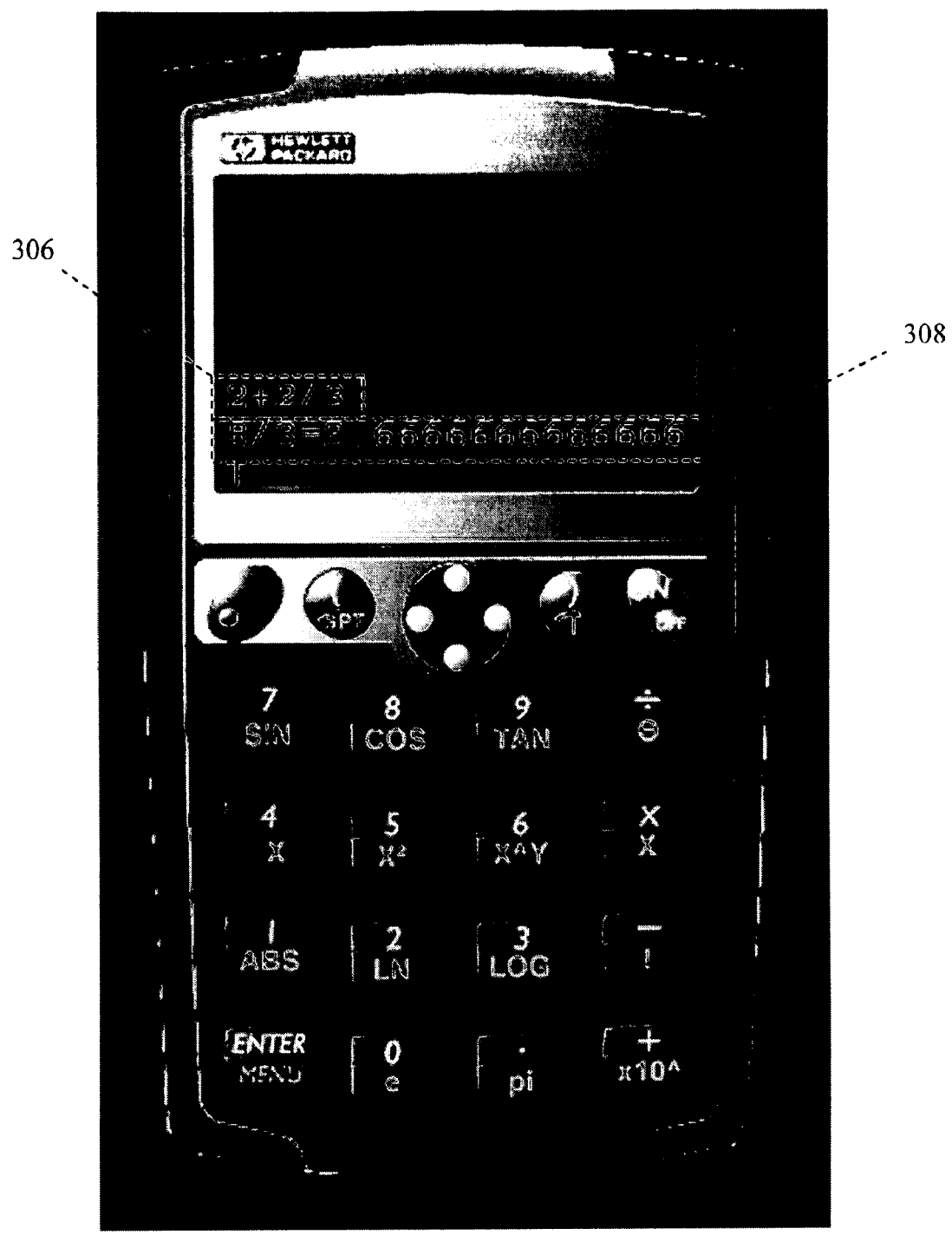

After the user manipulates the execute key 146, processor 204 evaluates the input fraction value 306 and drives display 102 to display the result 308, i.e. "8/3=2.6666666666666", to the user as depicted in FIG. 4b. Result 308 includes a fraction version of the result separated by an equal sign from the decimal version of the result.

Figure 5A:
FIGS. 5a and 5b are depictions of a calculator display during another operation of a calculator according to an embodiment of the present invention.

With reference to FIG. 5a, display 102 displays a user input of fraction addition 310, i.e. "4/5 plus 2/3," by sequential manipulation of the four key 130, the division key 128, the five key 132, the addition key 152, the two key 140, the division key 128, and the three key 142. The upright bar symbol, "|", at the end of fraction addition 310 indicates the cursor position to the user during editing/input of the user-entered expression, i.e. fraction addition 310.

Figure 5B:
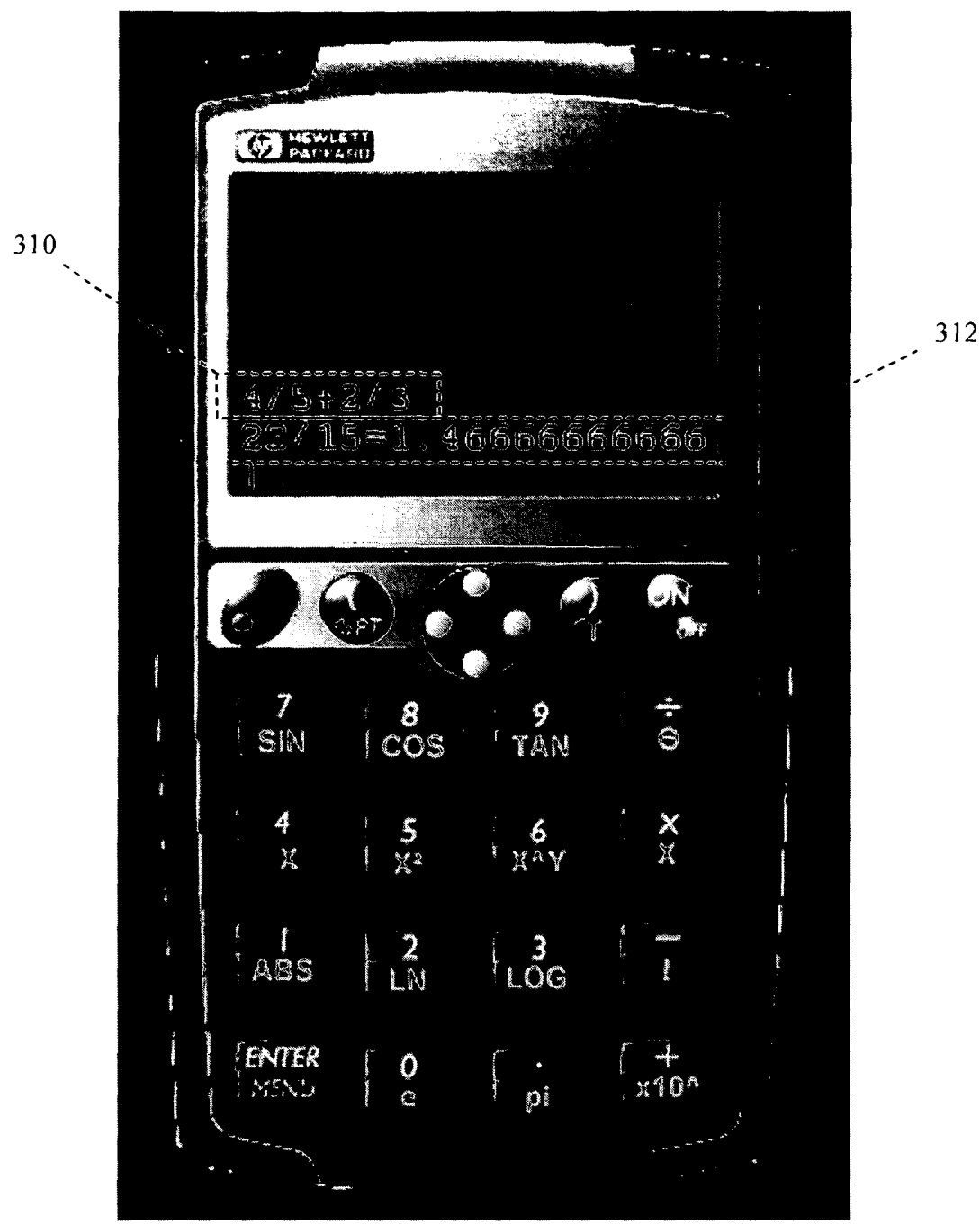

After the user manipulates the execute key 146, processor 204 evaluates the input fraction addition 310 and drives display 102 to display the result 312, i.e. "22/15=1.46666666666", to the user as depicted in FIG. 5b. Result 312 includes a fraction version of the result separated by an equal sign from the decimal version of the result.

It is to be understood that in another embodiment, the fractional result may be displayed differently depending on if the value is greater than 1: (1) A/B or (2) A+B/C. For example, $2+4/5=14/5=2.8$.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

For example, as depicted in FIGS. 1 and 3-5, key labels may differ according to different embodiments, e.g. the division key 128 in FIG. 1 is represented by a slash mark whereas in FIGS. 3-5 the same key is represented by a ÷ symbol. The symbols are interchangeable and represent the same calculator functionality.

What is claimed is:

1. A method of input and evaluation of fractions using a calculator, the method comprising:
   receiving a user-entered expression including a first fractional value, wherein the first fractional value is entered using a division symbol;
   evaluating the user-entered expression; and
   displaying the evaluated user-entered expression, wherein the evaluated user-entered expression comprises a second fractional value and a decimal value corresponding to the second fractional value.

2. The method as claimed in claim 1, wherein the displaying step further comprises the step of:
   if the second fractional value of the evaluated user-entered expression is greater than 1, displaying the evaluated user-entered expression comprising a whole number component.

3. The method as claimed in claim 2, wherein the displayed evaluated user-entered expression is displayed as the whole number component followed by an addition symbol followed by the numerator of the second fractional value followed by the denominator of the second fractional value.

4. The method as claimed in claim 1, wherein the division symbol separates the numerator from the denominator of the first fractional value.

5. The method as claimed in claim 1, wherein the user-entered expression including a first fractional value further comprises a whole number component.

6. The method as claimed in claim 1, wherein the user-entered expression is input as the whole number component followed by an addition symbol followed by the numerator of the first fractional value followed by the denominator of the first fractional value.

7. The method as claimed in claim 4, wherein the numerator comprises a third fractional value.

8. The method as claimed in claim 4, wherein the denominator comprises a third fractional value.

9. A calculator enabling input and evaluation of fractions, the calculator comprising:
   means for receiving and displaying a user-entered expression comprising a first fractional value, wherein the first fractional value is entered using a division symbol;

a processor for evaluating the user-entered expression; and a display for displaying the evaluated user-entered expression, wherein the evaluated user-entered expression comprises a second fractional value and a decimal value corresponding to the second fractional value.

10. The calculator as claimed in claim 9, further comprising:

if the second fractional value of the evaluated user-entered expression is greater than 1, the display is arranged to display the evaluated user-entered expression comprising a whole number component.

11. The calculator as claimed in claim 10, wherein the display is arranged to display the evaluated user-entered expression as the whole number component followed by an addition symbol followed by the numerator of the second fractional value followed by the denominator of the second fractional value.

12. The calculator as claimed in claim 9, wherein the division symbol separates the numerator from the denominator of the first fractional value.

13. The calculator as claimed in claim 9, wherein the user-entered expression including a first fractional value further comprises a whole number component.

14. The calculator as claimed in claim 9, wherein the means for receiving and displaying is arranged to receive the user-entered expression input as the whole number component followed by an addition symbol followed by the numerator of the first fractional value followed by the denominator of the first fractional value.

15. The calculator as claimed in claim 9, wherein the calculator is a hand-held graphical calculator.

16. A computer-readable medium storing instructions for enabling input and evaluation of fractions which, when executed by a processor, cause the processor to:

receive and cause the display of a user-entered expression comprising a first fractional value, wherein the first fractional value is entered using a division symbol;

evaluate the user-entered expression; and cause the display of the evaluated user-entered expression, wherein the evaluated user-entered expression comprises a second fractional value and a decimal value corresponding to the second fractional value.

17. A calculator enabling input and evaluation of fractions, the calculator comprising:

an input area for receiving a user-entered expression;

a display for displaying an evaluated user-entered expression; and a processor arranged to:

evaluate the received user-entered expression, wherein the user-entered expression comprises a first fractional value and wherein the evaluated user-entered expression comprises a second fractional value and a decimal value corresponding to the second fractional value; and cause the display to display the evaluated user-entered expression.

\* \* \* \* \*